March 25, 1958 R. W. GRAHAM 2,827,885
VALVE ROTATION DEVICE
Filed Feb. 8, 1955 3 Sheets-Sheet 1

Inventor
Robert W. Graham
By J. C. Thorpe
Attorney

Inventor
Robert W. Graham
By S. C. Thorpe
Attorney

March 25, 1958 R. W. GRAHAM 2,827,885
VALVE ROTATION DEVICE
Filed Feb. 8, 1955 3 Sheets-Sheet 3

Inventor
Robert W. Graham
By S. C. Thorpe
Attorney

United States Patent Office 2,827,885
Patented Mar. 25, 1958

2,827,885

VALVE ROTATION DEVICE

Robert W. Graham, Grosse Pointe, Mich., assignor to General Motors Corporation, Detroit, Mich., a corporation of Delaware Application February 8, 1955, Serial No. 486,775

14 Claims. (Cl. 123—90)

This invention relates to poppet valve mechanisms for internal combustion engines and the like, and particularly to improvements in the means of Leach Patent 2,613,656 for rotating the valve and damping valve spring surge.

In said Leach patent a Belleville spring is inserted between one end of the valve return coil spring and the normal abutment surface for said spring end, so that as the coil spring thrust increases and decreases with opening and closing of the valve the Belleville spring deflects between a normally divergent and a parallel abutting relation with the abutment surface to alternately restrain and accommodate rotation between said spring end and the abutment surface in timed relation with the valve reciprocating cycle, thereby obtaining a progressive intermittent rotation of the valve along with damping of any tendency of the coil spring to surge.

I have found that the operation of that device can be greatly improved by inserting an element such as a generally flat relatively rigid washer between the coil spring and the Belleville, whereby the mutually abutting surfaces of the Belleville and said washer, rather than the opposite surface or end face of the Belleville and its abutment means, are utilized to vary the frictional restriction to rotation of the valve. The insertion of such a washer apparently presents a more uniform bearing pressure for coaction with the Belleville with a resultant better control of the rotation and non-rotation of the valve, as well as having the advantage of relieving the Belleville of high local stress concentrations present when the coil spring bears directly thereon as in the previous Leach device.

It is accordingly the principal object of this invention to improve the aforesaid Leach device.

Further and more specific objects of the invention relate to additional improvements therein having to do with the employment of particular surface configurations of the washer and Belleville members in relation to the supporting abutment means for the Belleville, the means for introducing lubricant to the washer and Belleville inter-abutting surfaces and the means for imparting a positive rotative force to the valve.

The means by which these and other objects and advantages of the invention are carried out will be readily apparent from the following description of various preferred embodiments of the invention chosen for illustration, having reference to the drawings wherein.

Figure 1:
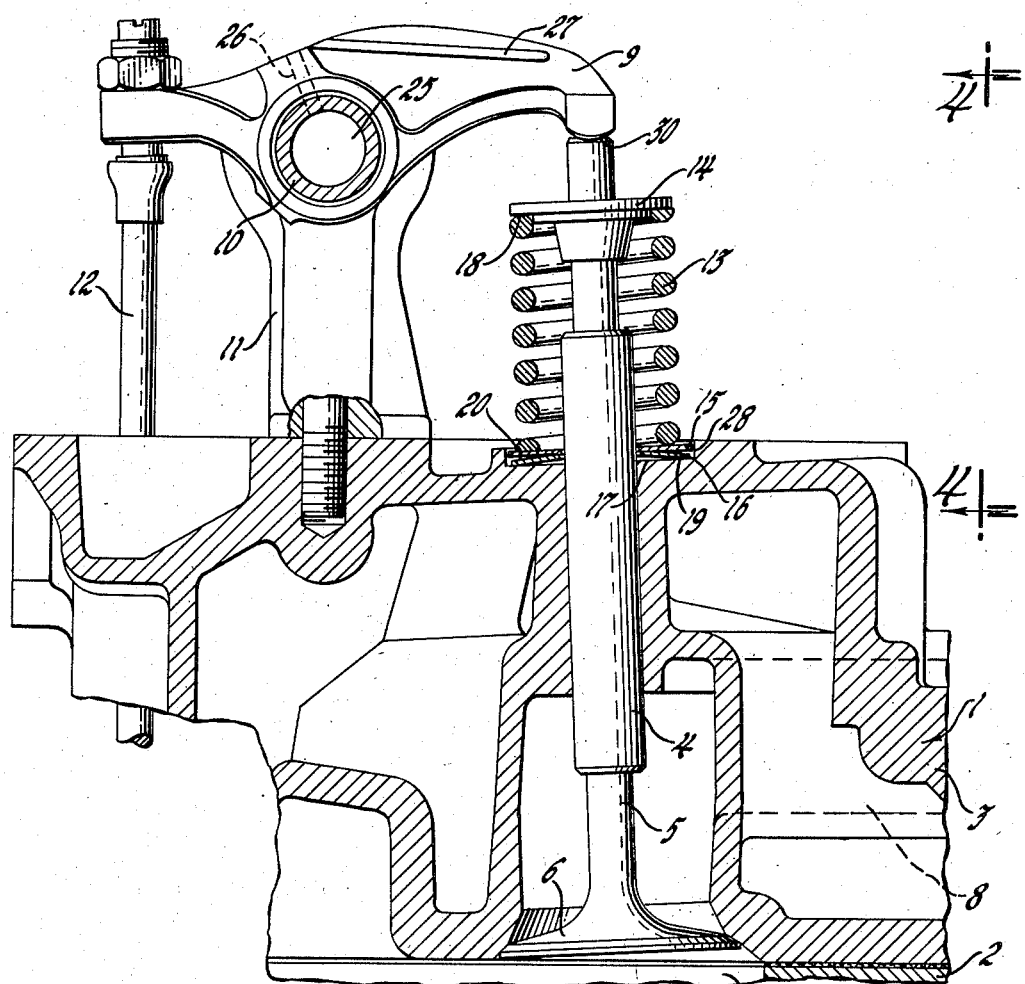
Figure 1 is a transverse view of a portion of an internal combustion engine, with parts broken away and in section, showing one form of my valve rotation device in the valve closed condition.

Referring now to the drawings in detail, and particularly to Figures 1-4, the numeral 1 designates generally the frame of an internal combustion engine of the valve-in-head type including a cylinder block 2 and cylinder head 3. Guided for reciprocation and rotation by a bushing 4 fixed in the cylinder head is the stem 5 of a poppet valve 6 which normally closes communication between the engine combustion chamber 7 and the inlet passage 8. Valve reciprocating means is illustrated as including a rocker 9 oscillating about a hollow shaft 10 whose axis extends generally perpendicularly and is laterally remote from the stem axis. The shaft 10 is suitably supported from the head by any desired means such as the posts 11. Also shown included in the valve reciprocating means is the conventional push rod 12 for drivingly actuating the rocker 9, and a valve return coil spring 13 which embraces the valve stem. Abutment means 14 for one end of the return spring 13 is suitably fixed in any desired manner to the valve stem, and the other end of the return spring reacts against fixed abutment means which includes the cylinder head 3 and the device including the two mutually abutting elements 15 and 16. In the arrangement shown, the element 15 is in the form of a relatively rigid and generally flat washer whose upper end face bears directly against the adjacent end coil of the return spring 13, and the element 16 is a Belleville spring having a normally dished configuration such that its outer marginal extremities abut an annular surface 17 of the cylinder head and its inner marginal extremites abut the bottom end face of the upper washer 15.

Instead of the arrangement shown, the washers 15 and 16 could be inserted between the upper end convolution of the return spring 13 and the opposing annular thrust surface 18 of the stem abutment 14.

Figure 2:
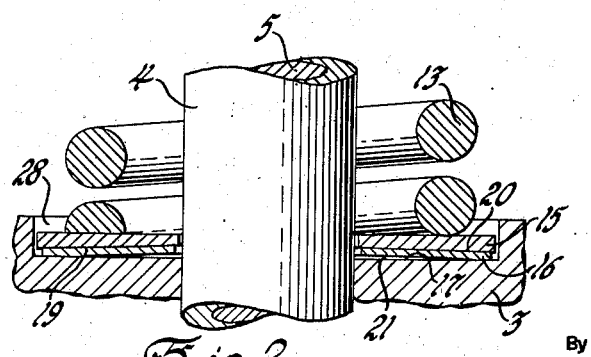
Figure 2 is an enlarged fragmentary view similar to Figure 1 but showing the parts in the valve open condition.
Figure 3:
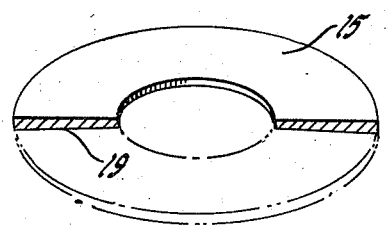
Figure 3 is a perspective view of the Belleville spring loading washer per se, with a portion broken away to show its radial sectional configuration.

The upper washer 15 as best shown in Figure 3 may be made with a tapered radial section so that its lower end face 19 is somewhat dished. The extent of the dished configuration of face 19, however, is substantially less than the dished configuration of the upper end face 20 of the Belleville spring in the valve closed condition of Figure 1. Also, as best illustrated in Figure 2 the annular surface 17 supporting the Belleville spring is preferably made flat, or at least has its radial configuration divergent to the bottom end face 21 of the Belleville when the latter has been deflected to its valve open condition. Also, as clearly shown in Figure 2, the dished configuration of the upper washer bottom face 19 is such that it will conform in angularity to the upper end face 20 of the Belleville spring in the valve open condition.

In operation, as the valve 6 is driven downwardly in the opening direction against the increasing thrust of the return spring 13 the relatively high frictional unit pressures between the upper washer 15 and the Belleville spring and between the Belleville spring and the cylinder head surface 17 initially prevent relative rotation of the lower end of the coil spring and the cylinder head. As the valve continues its opening movement, however, the divergence between the washer end face 19 and the Belleville spring face 20 decreases with resultant decrease in bearing pressure therebetween until the surfaces 19 and 20 are in substantial parallelism to accommodate their relative rotation and consequent rotation of the valve and coil return spring relative to the cylinder head. Because of the bottom end face 21 of the Belleville spring and the cylinder head thrust surface 17 are still divergent to each other in the fully open valve position of Figure 2, however, no relative rotation between the Belleville spring and the cylinder head is permitted to take place. Also, by reason of the high unit engagement pressure between the bottom end convolution of the coil spring and the upper face of the washer 15, no relative rotation of these members will occur throughout the valve reciprocating cycle.

By reason of the washer 15 and the Belleville spring 16 being located under the coil spring on the cylinder head their surfaces 19 and 20 are normally supplied with oil from the valve stem and rocker lubricating system. That is, the cylinder head of valve-in-head engines is at all times copiously supplied with lubricating oil from the engine lubricating system and hence there is always an ample supply of oil to lubricate the surfaces 19 and 20. This oil is permitted to flow between the washer 15 and the Belleville 16 while the surfaces 19 and 20 are divergent to each other, and is squeezed out from between the surfaces 19 and 20 during collapsing of the Belleville spring. A sufficient delay in this oil escape from between these surfaces 19 and 20 occurs, however, that during a portion of the reciprocating cycle a film of oil is trapped between those surfaces to augment the anti-friction bearing relation thereof while they are in a conforming or parallel relation to each other.

Figure 4:
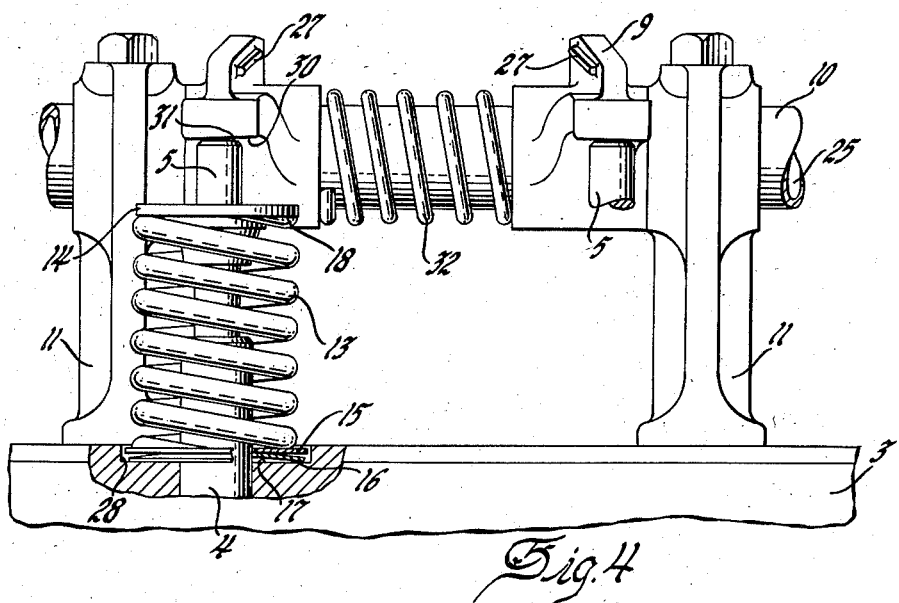
Figure 4 is a view taken from line 4—4 of Figure 1 to illustrate the angular "bias" between the valve stem end and the driving surface of its associated valve rocker.

As shown in Figures 1 and 4 the aforesaid lubricating means includes the axial passage 25 within the hollow rocker shaft 10 through which oil is conducted from the engine oil pump (not shown). To conduct this oil from the rocker shaft the rockers may be provided with a radial passage 26 (Figure 1) leading to the upper surfaces of the rocker, from which the oil may flow toward the valve stem 5. For rockers which do not have a substantial pitch downward to the stem from the rocker shaft, there may be provided a ledge 27 which serves to carry the oil downwardly and outwardly toward the valve stem, from where it can drain down on to the top of the cylinder head. If necessary, the annular surface 17 of the cylinder head below the Belleville spring may be recessed in a counterbore 28 whose side walls closely surround the washer 15 and Belleville 16 to provide an oil receiving well.

During reciprocation of the valve there are various forces such as are produced by the coiling and uncoiling action of the valve return spring 13, flow of gases over the head of the valve, etc., as well as the influence of vibration generally, which are transmitted to the valve stem tending to cause it to rotate in alternately opposite directions. While these rotative forces are not always positive or of sufficient intensity to overcome the frictional drag imposed on the stem by the coil return spring in conventional mechanisms, through the means above described for alternately holding and releasing the return spring for rotation such forces are taken advantage of in effecting a progressive rotation of the valve during operation. To further augment the tendency of the valve to rotate during reciprocation, I have arranged the stem engaging face 30 of the valve rocker to have a slight (e. g. 1–1½ degrees) angle or "bias" with the end face 31 of the valve stem, thereby effectively offsetting the interengagement of the rocker and stem longitudinally of the axis of the rocker shaft 10. In an installation such as shown in Figure 4 wherein adjacent rockers are separated by a rocker shaft spring 32 biasing the rockers into their proper longitudinal positions abutting the shaft supporting posts 11, this angular "bias" is so directed that the effective offset of the rocker face 30 is toward the adjacent post 11. As a result, during each valve opening movement the rocker surface 30 transmits a rotating force to the valve stem throughout the horizontal component of the movement of the rocker face 30 about its shaft 10. Although this rotative force is imparted to the stem in alternately opposite directions about the stem axis, because of the clutching and declutching of the return spring from the cylinder head by the washers 15 and 16 during each valve stroke there is a net effective rotation of the valve realized during each reciprocating cycle. Thus, with a Belleville spring of suitable rate in relation to the deflection rate of the coil spring 13, and with the surfaces 19 and 20 of the washer and Belleville spring of proper angle and area commensurate with the spring rates and the range of reciprocating valve speeds required, the coil spring will be restrained from rotating in response to the turning effort imparted by the rocker in one direction, and then allowed to turn in response to the rocker turning force imparted in the opposite direction. It will be appreciated that even though the coil spring is withheld from rotation during only a portion of the period turning effort is imparted to the stem in one direction by the rocker, and is then allowed to rotate only during a portion of the period in which turning effort is imparted in the opposite direction by the rocker, a net gain of unidirectional rotation of the valve can be realized by so selecting the spring rates and dimensions of the surfaces 19, 20 and the amount of the valve stem-to-rocker offset to obtain the desired differential between clutched and declutched periods.

Figure 5:
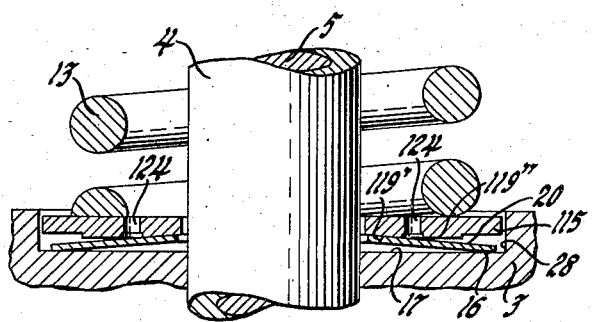
Figures 5 and 6 are views similar to Figure 4 but showing a modified form of the device in the valve closed and open conditions, respectively.
Figure 6:
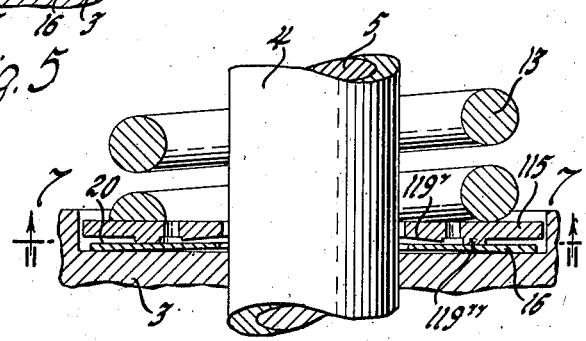
Figure 7:
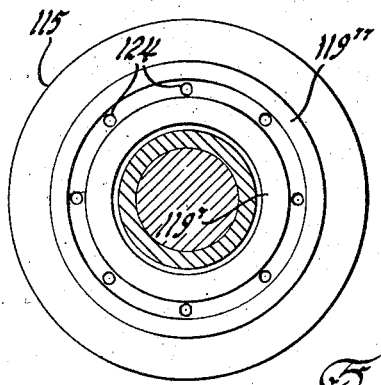
Figure 7 is a sectional view taken substantially on line 7—7 of Figure 6.

In the modified form of the invention as illustrated in Figures 6 and 7 the upper washer 115 has its Belleville spring abutting face divided into inner and outer concentric lands 119' and 119". As shown, these lands are of approximately equal width radially of the stem, and extending through the washer 115 between these lands are a plurality of holes 124. One of these lands (119' as shown) has a dished configuration conforming to the upper end face 20 of the Belleville spring when the latter is in its valve closed position of Figure 5, and the other land 119" is dished to conform with the Belleville surface 20 in the valve open position, as shown in Figure 6.

The operation of this form of the invention is generally similar to that previously described except that by reason of the different dished configurations of the lands 119', 119" there is at all times one of them divergent to the Belleville surface 20 so that oil may flow between it and the surface 20 while the oil film between the other land and the Belleville surface 20 is in the process of being "squeezed out." Thus, beginning with the parts in the valve open position of Figure 5, oil may enter between the outer land 119" and the Belleville as the Belleville deflects to its Figure 6 condition with increased thrust of the coil spring 13. As the load increases the load thus transfers from the inner land to the outer land which is covered by an oil film. If the frequency of reciprocation of the valve is high enough in relation to the loading pressure on the outer land, the oil film will not be squeezed out until the load is retransferred back to the inner land 119' which is then itself covered with a film of oil to maintain the anti-friction bearing relation between the coil spring and the cylinder head. With such a design a substantially continuous "free-valve" condition is maintained throughout all or at least an extended portion of each valve stroke.

Figure 8:
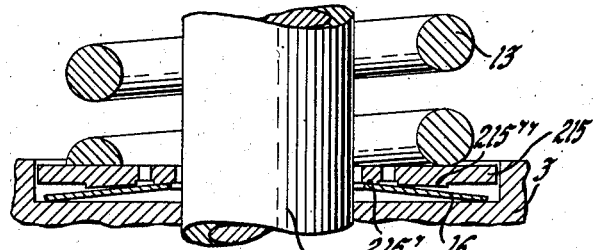
Figures 8 and 9 illustrate a third modification of the invention in the valve open and closed positions, respectively.
Figure 9:
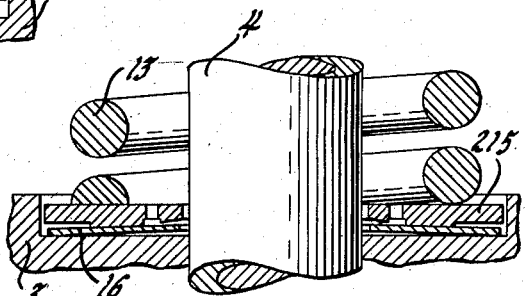
Figure 10:
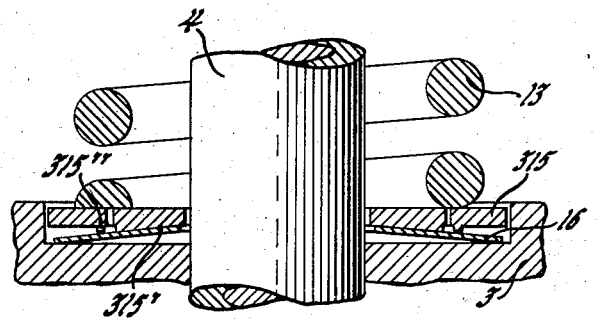
Figures 10 and 11 illustrate a fourth modification in the valve open and closed positions, respectively.
Figure 11:
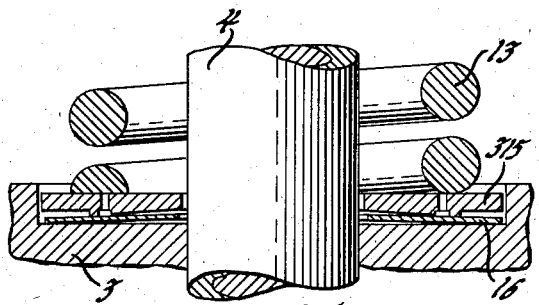

By making the inner or outer land wider than the other land an anti-friction bearing between the coil spring and the cylinder head is afforded only during the earlier or later portion, respectively, of the valve reciprocating cycle. Thus, as shown in Figures 8 and 9, the inner land 215' of the upper washer 215 is made relatively narrow and the outer land 215" is made relatively wide. Therefore, as the valve opens, rotation of the spring 13 is initially withheld by the frictional engagement of the narrow land 215', the load being eventually transmitted to the wider outer land 215" with increased opening movement of the valve. When the load is transferred back to the narrower inner land 215' on the return stroke of the valve, rotation of the coil spring is again arrested. Figures 10 and 11 show the reverse relation wherein the upper washer 315 has a narrow outer land 315″ and a wide inner land 315′, with the result that the operation is oppositely timed to that of Figures 8 and 9.

Although only certain preferred embodiments of the invention have been illustrated and described, it is appreciated that various minor modifications of the parts may be made all coming within the spirit and scope of the invention as defined in the following claims.

I claim:

1. In combination with a poppet valve mounted for axial rotation and reciprocation, valve reciprocating means including means applying an increasing thrust to the valve in opposition to its movement in one direction longitudinally of its axis of rotation, a surface in thrust receiving relation with said thrust applying means, a pair of elements positioned to transmit said thrust between said surface and said thrust applying means having mutually abutting end faces, one of said elements being operatively fixed against rotation relatively of said thrust applying means and having its said end face divergent to said end face of the other element during a portion of each valve reciprocating cycle whereby a high unit bearing pressure exists between said end faces sufficient to frictionally restrain their relative rotation, one of said elements being resiliently flexible with change in thrust of said applying means to decrease the divergence between said end faces and thereby reduce the unit bearing pressure therebetween to an amount accommodating their relative rotation during another portion of the valve reciprocating cycle.

2. In combination with a poppet valve mounted for axial rotation and reciprocation, valve reciprocating means including means applying an increasing thrust to the valve in opposition to its movement in one direction longitudinally of its axis of rotation, a surface in thrust receiving relation with said thrust applying means, a pair of elements transmitting said thrust between said surface and said thrust applying means having mutually abutting end faces, one of said elements being operatively fixed against rotation relatively of said thrust applying means and having its said end face divergent to said end face of the other element during relatively light thrust application by said applying means whereby a high unit bearing pressure exists between said end faces sufficient to frictionally restrain their relative rotation, one of said elements being resiliently yieldable under increased thrust to decrease the divergence between said end surfaces and thereby reduce the unit bearing pressure therebetween to an amount accommodating their relative rotation.

3. In combination with a poppet valve mounted for axial rotation and reciprocation, valve reciprocating means including a return spring opposing movement of the valve in one direction longitudinally of its axis of rotation, a Belleville spring in thrust receiving relation with the return spring, a washer interposed between said springs having an end surface normally in divergent relation to the adjacent end face of the Belleville spring, said Belleville spring being yieldable under the increasing thrust of the return spring in opposing said valve movement to effect a parallel relation of its said end face and said washer surface, and means for conducting lubricant to said Belleville spring for entry between it and said washer when said end face and surface are in divergent relation.

4. In combination with a poppet valve having a stem mounted for axial rotation and reciprocation, valve reciprocating means including a valve return spring embracing the stem, abutment means on the stem for one end of the spring, fixed abutment means for the other end of the spring, one of said abutment means including a rigid washer, a Belleville spring in thrust receiving relation with the return spring and having one of its end faces thrustably bearing on one end face of said washer and radially divergent thereto under relatively light thrust loads imposed by said return spring but yieldable under increased return spring thrust to radially conform to said washer face, and a rigid member having an annular surface thrustably supporting the opposite end of the Belleville spring.

5. The invention defined in claim 4, wherein said annular surface is radially divergent to said opposite end face of the Belleville spring when said one end faces are in radial conformity.

6. The inventon defined in claim 4, wherein said annular surface is substantially flat and said washer one end face is less radially divergent to said Belleville spring one end face than is the Belleville spring opposite end to said annular surface under minimum thrust load of the return spring.

7. In combination with a poppet valve having a stem mounted for axial rotation and reciprocation, valve reciprocating means including a valve opening rocker mounted for oscillation about an axis generally perpendicular to the stem and laterally remote therefrom and a valve closing spring embracing the stem, said rocker having a stem driving surface engageable with the stem in longitudinally offset relation longitudinally of said axis from the stem axis, a pair of washers in thrust receiving relation with said spring and having mutually abutting end faces, one of said washers being operatively fixed against rotation relatively of the spring, the other of said washers being radially resilient and yieldable with increased thrust of the spring during valve opening from a condition in which its said end face is divergent to a condition in which its said end face is substantially parallel to said end face of said one washer, and means for supplying lubricant to one of said end faces when in divergent relation to the other thereof.

8. In combination with a poppet valve having a stem mounted for axial rotation and reciprocation, valve reciprocating means including a valve opening rocker mounted for oscillation about an axis generally perpendicular to the stem and laterally remote therefrom and a valve closing spring embracing the stem, said rocker having a stem driving surface engageable with the stem in longitudinally offset relation longitudinally of said axis from the stem axis, a pair of axially adjacent washers in series thrust with said spring, one of said washers being operatively fixed against rotation relative to the spring and having its end adjacent the other washer provided with radially spaced annular concentric lands, a member presenting an annular surface in abutment with the end of the other washer oppositely of said one washer, said other washer having a normally dished configuration relative to said annular surface under the thrust of the spring when the valve is closed and being axially resilient and yieldable to a less dished configuration relative to said annular surface under the thrust of the spring when the valve is open, said lands having dished configurations sequentially abutting and conforming to the adjacent end face of the other washer as said other washer deflects with increasing spring thrust during valve opening, and means for supplying lubricant to said adjacent end face for entry between it and the respective lands when out of abutment therewith.

9. In combination with a poppet valve having a stem mounted for axial rotation and reciprocation, valve reciprocating means including a valve opening rocker mounted for oscillation about an axis generally perpendicular to the stem and laterally remote therefrom and a valve closing spring embracing the stem, said rocker having a stem driving surface engageable with the stem in longitudinally offset relation longitudinally of said axis from the stem axis, a pair of axially adjacent washers in series thrust with said spring, one of said washers being operatively fixed against rotation relative to the spring and having its end adjacent the other washer provided with radially spaced annular concentric lands, a member presenting an annular surface in abutment with the end of the other washer oppositely of said one washer, said other washer having a normally dished configuration relative to said annular surface under the thrust of the spring when the valve is closed and being axially resilient and yieldable to a less dished configuration relative to said annular surface under the thrust of the spring when the valve is open, one of said lands being dished to conform with the adjacent end face of the other washer when the valve is closed and the other of said lands being dished to conform with said adjacent end face when the valve is open.

10. The invention defined in claim 8, wherein said lands are approximately equal in radial width.

11. The invention defined in claim 8, wherein said lands are of unequal radial width.

12. The invention defined in claim 8, wherein said last named means includes apertures extending through said one washer intermediate said lands.

13. The invention defined in claim 9, wherein said one land is substantially narrower than said other land.

14. The invention defined in claim 9, wherein said one land is substantially wider than said other land.

References Cited in the file of this patent

UNITED STATES PATENTS

| | | |
|---|---|---|
| 1,305,397 | Murdock | June 3, 1919 |
| 2,589,418 | Mitzelfeld et al. | Mar. 18, 1952 |
| 2,613,656 | Leach | Oct. 14, 1952 |
| 2,743,714 | Hanson et al. | May 1, 1956 |
| 2,767,696 | Engemann | Oct. 23, 1956 |

FOREIGN PATENTS

| | | |
|---|---|---|
| 688,597 | Great Britain | Mar. 11, 1953 |